United States Patent [19]

Beccaris et al.

[11] Patent Number: 5,123,510

[45] Date of Patent: Jun. 23, 1992

[54] CLUTCH WITH A PLURALITY OF FRICTION DISCS, ESPECIALLY FOR MOTOR VEHICLES

[75] Inventors: Carlo Beccaris, Santena, Italy; Jacques T. de Briel, Levallois Perret, France

[73] Assignee: VALEO, Paris, France

[21] Appl. No.: 708,859

[22] Filed: May 31, 1991

[30] Foreign Application Priority Data

May 31, 1990 [FR] France ............................ 90 06763
Nov. 28, 1990 [FR] France ............................ 90 14871

[51] Int. Cl.$^5$ ............................ F16D 13/44; B60K 17.02
[52] U.S. Cl. ............................ 192/70.13; 192/70.19; 192/109 B
[58] Field of Search ............... 192/70.16, 70.19, 70.2, 192/70.18, 109 R, 109 A, 109 B, 70.13, 70.27

[56] References Cited

U.S. PATENT DOCUMENTS

| | | |
|---|---|---|
| 1,756,428 | 4/1930 | Jones . |
| 4,815,189 | 3/1989 | Ijames et al. .................. 192/70.13 X |
| 4,892,177 | 1/1990 | Lanzarini et al. ............ 192/70.17 X |

FOREIGN PATENT DOCUMENTS

| | | |
|---|---|---|
| 2623826 | 6/1989 | France . |
| 555295 | 8/1943 | United Kingdom . |
| 663929 | 12/1951 | United Kingdom . |
| 753732 | 8/1956 | United Kingdom . |

*Primary Examiner*—Rodney H. Bonck
*Attorney, Agent, or Firm*—Longacre & White

[57] ABSTRACT

A clutch includes a reaction plate, a cover plate, a pressure plate, and, disposed between the pressure and reaction plates, at least two friction discs and at least two intermediate discs. The intermediate driving member has at least one thrust surface facing towards the reaction plate, with the intermediate disc adjacent to the reaction plate having a reaction surface associated with the thrust surface for cooperation with the latter so as to locate the intermediate disc axially.

10 Claims, 7 Drawing Sheets

CLUTCH WITH A PLURALITY OF FRICTION DISCS, ESPECIALLY FOR MOTOR VEHICLES

FIELD OF THE INVENTION

This invention relates to clutches of the kind having a plurality of friction discs, especially for motor vehicles. More particularly, the field of the invention is that of clutches of the above kind comprising: a reaction plate; a cover plate which is secured to the reaction plate; a pressure plate which is fixed with respect to the cover plate to the extent that it rotates with the latter, but which is mounted for axial movement with respect to the cover plate; and, arranged between the pressure plate and the reaction plate, firstly at least two friction discs which are fixed to a hub for rotation with the hub, and secondly at least two intermediate discs which are mounted for rotation with the reaction plate and the cover plate, with the friction discs being arranged alternately with the intermediate discs. One of the intermediate discs is arranged to come into contact with the reaction plate.

BACKGROUND OF THE INVENTION

A clutch of the above kind is described in the specification of French published patent application No. FR 2 623 862A. In that specification, the intermediate discs are coupled with the reaction plate for rotation with the latter, by means of a plurality of intermediate driving members in the form of spacing blocks.

Such an arrangement enables a cover plate of a standard type to be used. However, the intermediate disc which lies adjacent to the pressure plate is not located against axial movement with respect to the pressure plate. At the instant when the clutch is disengaged during a declutching operation, and during the withdrawal or retraction of the pressure plate, this results in a loss of travel for the friction disc or discs, with the latter not becoming spaced apart by a sufficiently large distance from the intermediate discs.

DISCUSSION OF THE INVENTION

An object of the present invention is to overcome the above drawbacks and thus to provide a novel intermediate driving member for driving the intermediate discs, such as to enable the intermediate disc adjacent to the reaction plate to be located axially while still using a cover plate of a standard type.

In accordance with the invention, a clutch having a plurality of friction discs, including: a reaction plate; a cover plate fixed with respect to the reaction plate; a pressure plate which is mounted for rotation with the said cover plate and for axial movement with respect to the latter; at least two friction discs disposed between the pressure plate and the reaction plate and mounted for rotation with a hub; and at least two intermediate discs disposed between the pressure plate and the reaction plate and mounted for rotation with the reaction plate and cover plate, with the said friction discs being arranged alternately with the intermediate discs, one of the latter being arranged to come into contact with the reaction plate and the intermediate discs being coupled to the reaction plate, for rotation with the latter, through at least one intermediate driving member, is characterised in that the intermediate driving member has at least one thrust surface which is directed towards the reaction plate, and in that the intermediate disc adjacent to the reaction plate has a reaction surface associated with the said thrust surface for the axial location of the said intermediate disc by cooperation with the said thrust surface.

During the declutching operation in a clutch according to the invention, the intermediate disc adjacent to the reaction plate is able to be held in position axially with a predetermined clearance or without any clearance, in such a way that the displacement of the friction discs can take place to a satisfactory extent.

In a preferred embodiment of the invention, the intermediate driving member consists of an intermediate crown member, having coupling means for driving in rotation the intermediate disc that is interposed between the two friction discs, with the said crown member having at least one notch formed in its face directed towards the reaction plate. The intermediate disc then has at least one projection associated with the said notch, for its axial location.

Thus the thrust surface is formed in the notch and the reaction surface on the projection. Coupling is thus achieved by mating between the notch and the projection. Such an arrangement enables the number of components in the clutch to be reduced, and this in turn facilitates warehousing and final assembly of the clutch.

In accordance with a major preferred feature of the invention, the said projection is in the form of a tenon having sharp edges, while the notch, which is preferably milled, has a base portion which is joined through rounded portions to the side flanks of the notch. With this arrangement, the intermediate disc concerned is able to nest in the notch by cooperation of the sharp edges of the tenon with the rounded portions of the notch. In addition, the projection can be made with a thickness which is smaller than the depth of the notch. The axial bulk of the assembly is thus not increased, and the intermediate disc can be made with more generous manufacturing tolerances on its thickness, while still having a facility for locating the intermediate disc by nesting without any clearance. This arrangement is of particular advantage when the friction discs and the intermediate discs are made of a carbon based material and are difficult to machine.

In the case in which an intermediate disc lies adjacent to the pressure plate, the latter is secured against the said disc so as to improve the degree of displacement, or axial travel, of the friction discs and to reduce the length of the axial lugs formed on the intermediate crown member.

All of these arrangements in accordance with the invention enable resilient means exerting a progressive axial force to be fitted between the reaction plate and its associated intermediate disc, and also between the pressure plate and its associated intermediate disc. Thus the clutch can be made to operate with a variable progressive axial force, which improves the comfort of the occupants of the vehicle.

The description which follows illustrates the invention in detail, by way of example only and with reference to the accompanying drawings.

DESCRIPTION OF PREFERRED EMBODIMENTS OF THE INVENTION

The clutch which will be described below is a clutch of the kind having two friction discs, particularly suitable for fast motor vehicles such as sports or racing cars. It comprises a plurality of annular members, all coaxial with each other, namely a reaction plate 1, a cover plate 2, an intermediate crown 3, a diaphragm 4, intermediate discs 6, 7 and 8, friction discs 9 and 10, and a hub 11. The reaction plate 1 is also the engine flywheel, and is fastened to the crankshaft (not shown) of the engine of the vehicle, in this particular example by means of bolts or studs 12 which are shown diagrammatically.

Figure 1:
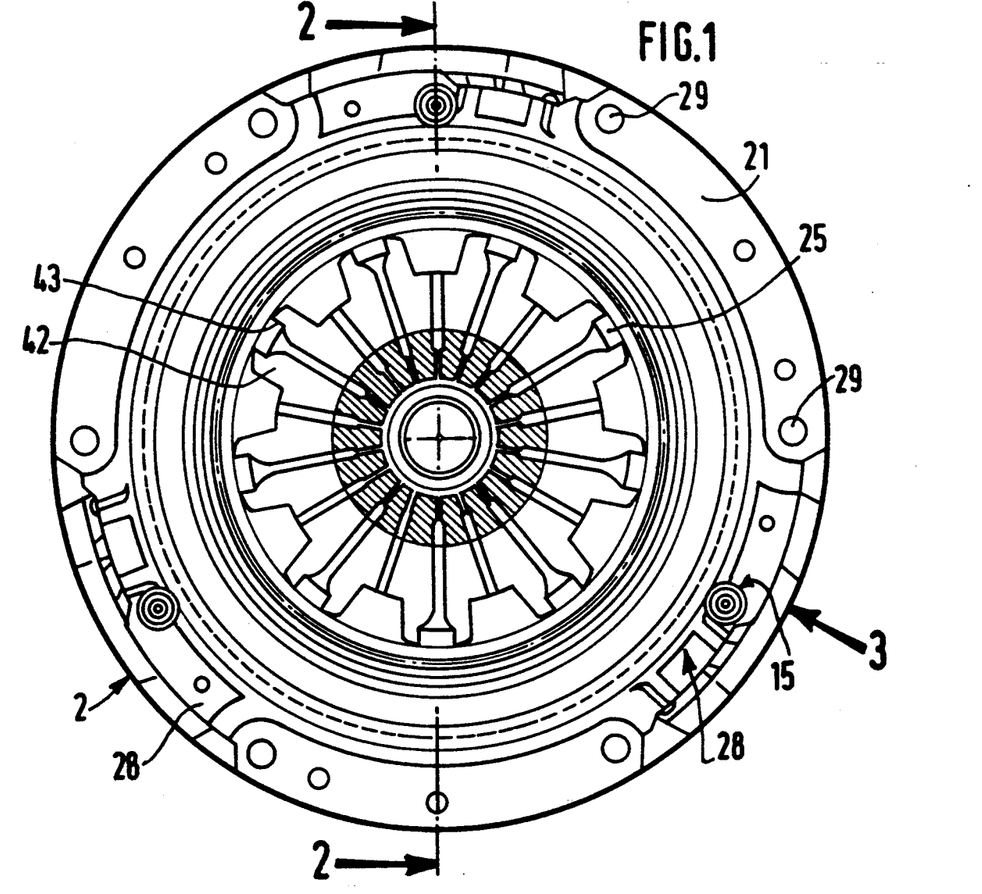
FIG. 1 is a view in elevation of the clutch in accordance with the invention.

The cover plate 2 is generally in the form of a hollow dish, and has an outwardly projecting radial fastening flange 21 which is joined to an annular skirt portion 22 oriented axially. The skirt portion 22 is joined to a base portion 23 which extends generally radially and towards the axis of the assembly. The base portion 23 has a projecting bead 24, and is also provided with assembly tabs 25. It has a central opening. The bead 24 acts as a primary stop element for the diaphragm 4. More precisely, the diaphragm 4 has a peripheral portion 41 defining a Belleville ring, and a central portion which is divided into radial fingers 42 separated by gaps (see FIG. 1), together with apertures 43 adjacent to the roots of the fingers 42, with the gaps between the fingers opening into the apertures 43.

The Belleville ring 41 bears internally on the annular bead 24, while externally the ring 41 bears on an annular lip 51 of the pressure plate 5. In this example, the annular lip 51 is divided into separate sections. The assembly tabs 25 extend through the apertures 43 of the diaphragm, being then bent radially outwards in the direction away from the axis of the assembly, so that they are hook-shaped. The purpose of the tabs 25 is to locate in position a sealing ring 14. This ring 14 constitutes a secondary engagement element for the Belleville ring 41, facing the bead 24.

In this way, the diaphragm 4 is mounted for tilting movement on the cover plate 2, and bears on the latter so as to urge the pressure plate 5 towards the reaction plate 1, thereby enabling the discs 6 to 10 to be gripped.

More precisely, the intermediate disc 6, the friction disc 10, the intermediate disc 7, the friction disc 9, and the intermediate disc 8 are interposed in axial succession, in the order mentioned, between the reaction plate 1 and the pressure plate 5.

The discs 6, 7 and 8, which in this example are driving discs, are secured to the reaction plate 1 and the cover plate 2, for rotation with them, through the crown 3 which thus acts as an intermediate drive member in a manner to be described below. The discs 9 and 10, which in this example are driven discs, being arranged alternately with the intermediate discs 6, 7 and 8, are mounted so as to be rotatable with the hub 11 while being movable axially. They are surrounded by the skirt portion 22 of the cover plate 2, by the discs 7 and 8, and by the pressure plate 5.

The crown 3 has means for coupling it in rotation, so as to drive the intermediate discs 7 and 8 while preserving their ability to move in the axial direction. In this example, this rotary coupling means consists of a plurality of axial lugs 32, fixed to the crown 3 (see FIGS. 3 and 6). Each lug 32 defines a mortice 36. The lugs 32 extend axially towards the base portion 23 of the cover plate, the mortices 36 being open towards the base portion and closed by a ring 31 of the crown 3. A plurality of tenons 71, 81 are arranged to cooperate with the mortices 36. These tenons 71 and 81 are carried by, and project radially from, the respective intermediate discs 7 and 8, see FIG. 6.

The lugs 32 are fixed to the closure ring 31 (and in this example they are integral with it). The ring 31 is inserted axially between the reaction plate 1 and the fastening flange 21 of the cover plate 2. The outer diameter of the closure ring 31 is, in this example, equal to the outer diameter of the fastening flange 21 of the cover plate 2. In this example, the lugs 32 are made integral with the closure ring 31 by being formed simultaneously by moulding or casting.

In a modification, the lugs 32 may be separate elements mounted on the closure ring 31, for example by welding, or by the use of screws or any other suitable type of fastener.

Figure 3:
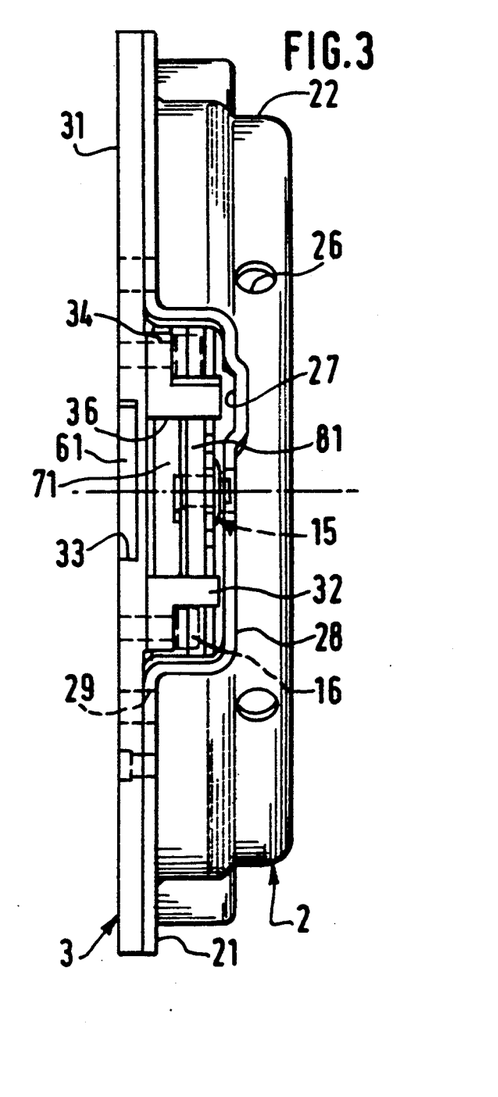
FIG. 3 is a view as seen in the direction of the arrow 3 in FIG. 1.

Referring to FIG. 3, the cover plate 2 is of a standard type, with its skirt portion 22 being provided with openings 27, each of which is delimited by a radial hood portion 28. The hood portion 28 is joined to the fastening flange 21, and would normally serve for securing tangential tongues which couple the pressure plate to the cover plate for rotation with it. In the present case, however, use is made of the opening 27 for insertion of the axial lugs 32, these lugs being designed and dimensioned accordingly.

The intermediate driving member or crown 3 has at least one thrust surface 35 (see FIGS. 5 and 6) which faces towards the reaction plate 1, while the intermediate disc 6 adjacent to the reaction plate 1 has a cooperating reaction surface 61, which engages the thrust surface 35 so as to locate the intermediate disc 6 axially with respect to the reaction plate 1. In this example, the intermediate disc 6 has at least one reaction surface 61 which cooperates with a notch 33 formed in the closure ring 31, on the side of the latter which faces axially towards the reaction plate 1. The thrust surface 35 is formed in the notch 33 itself, while the reaction surface 61 is formed on a projecting tenon of the intermediate disc 6.

Figure 6:
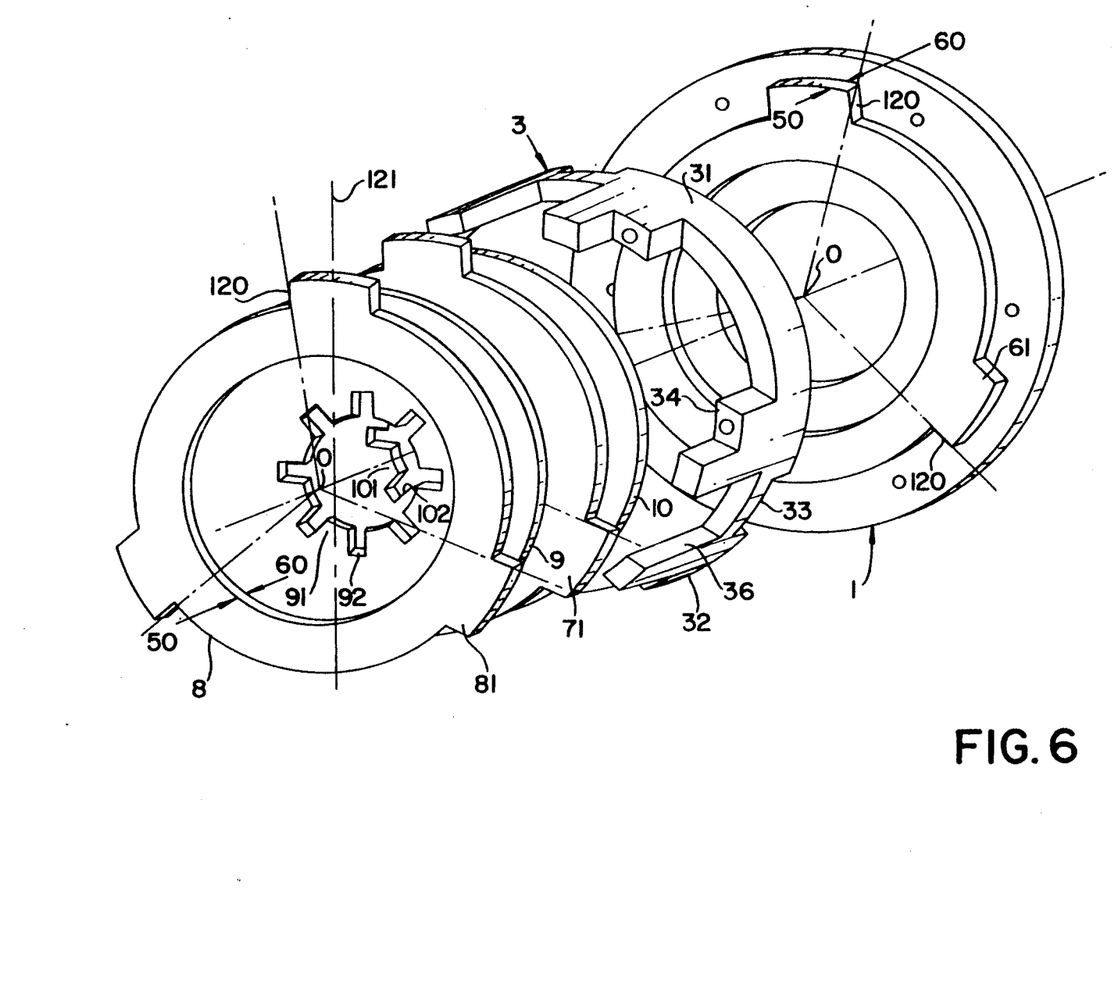
FIG. 6 is a simplified perspective view showing the intermediate discs, the friction discs, the intermediate crown and the reaction plate of the clutch in accordance with the invention.

The rotational coupling means 32 for the intermediate discs 6, 7 and 8 are thus fixed with respect to an intermediate driving crown 3, which is adapted to be inserted axially between the cover plate 2 and the reaction plate 1. At least one notch 33 is formed, as can be seen in FIG. 6, on that side of the crown 3 that faces towards the reaction plate 1. The intermediate disc 6 adjacent to the reaction plate 1 has at least one projecting element 61, which cooperates with this notch 33 so as to locate the intermediate disc 6 axially and to drive the latter in rotation.

It will be noted that in this example, each intermediate disc has three tenons which are spaced apart circumferentially at 120° with respect to each other. It will also be noted that the cover plate 2 has three hood portions 28 and three openings 27. The crown 3 has three axial lugs 32, three mortices 36, and three notches 33.

The outer diameter of the discs 6 to 10 determines the internal diameter of the closure ring 31 and of the lugs 32, according to requirements, but in such a way that, in particular, the discs 7 to 10 are able to penetrate within the circular envelope defined by the lugs 32, while the intermediate disc 6 can penetrate into the interior of the closure ring 31.

Figure 5:
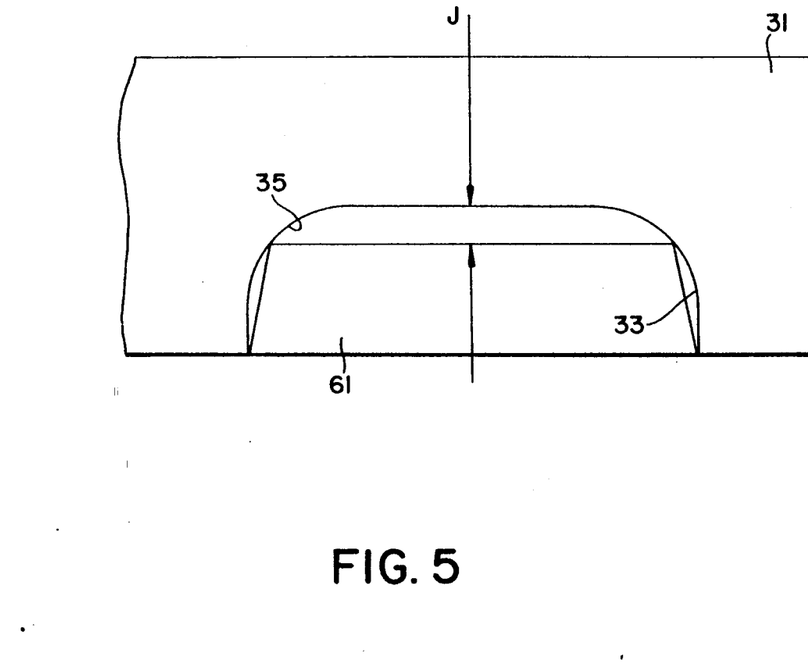
FIG. 5 is a detail view showing the form of the notch formed in the intermediate crown on the clutch.

In this example the closure ring 31 is of metal. The notches 33 may be formed by a milling operation, and may extend through the whole radial height of the closure ring 31. The shape of the notches 33 depends on that of the tenons of the intermediate disc 6, which in this example, as shown in FIG. 5, have inclined flanks.

The number of tenons 81, mortices 36, notches 33, and hood portions 28 does of course depend on the requirements of the application to which the clutch is to be put, and on the size of the cover plate 2. The same is true for securing means 15 indicated in FIGS. 3 and 4, which will be described below.

There may however be more than three of each of these elements. It is even possible to differentiate between the intermediate disc 6 on the one hand and the other discs 7 and 8 on the other hand, by providing a number of notches 33 that is different from the number of mortices 36.

The tenons of the discs 6, 7 and 8 overlap the notches 33 and mortices 36 radially in this example, with the notches 33 being arranged at the level of (i.e. in circumferential alignment with) the lugs 32, which have two lateral shouldered portions 34 to support the heads of screws 16 securing the crown 3 to the reaction plate 1. The mechanical strength of the crown 3 is thus able to be made satisfactory despite the presence of the notches 33. In addition, because of the screws 16 and notches 33, it is possible to build a sub-assembly consisting of the crown 3, the intermediate disc 6 and the reaction plate 1, thus enabling the intermediate disc 6 to be inspected.

The cover plate 2 is also secured to the reaction plate 1 by means of screws (not shown), which extend through holes 29 in the fastening flange 21 of the cover plate, and through corresponding holes formed in the closure ring 31 (see FIG. 3).

The notch 33 has a base portion which is joined through rounded portions 35 to two axially disposed side flanks of the notch, and is generally U-shaped. The projecting tenon 61 has a circumferential width, subject to fitting clearances, equal to the distance separating the side flanks of the notch 33. Its thickness is less than the depth of the notch 33, so that a clearance J (FIG. 5) exists between the base of the notch 33 and the tenon 61 with its inclined flanks. The edges of the tenon 61 constitute stop or reaction surfaces and are inclined at sharp angles. They are designed so as to cooperate with the rounded portions 35 of the thrust surface, these rounded portions constituting the actual working part of the latter.

The face of the intermediate disc 6 and the face of the intermediate crown 3 that face towards the reaction plate 1 lie in the same plane. Thus, during assembly by tightening the screws 16 into the reaction plate 1, the crown 3 is offered up to the reaction plate 1 so that the tenon 61 comes to bear on the rounded stop surfaces 35. In this way, the intermediate disc 6 is located axially without any play, but with coupling in rotation.

Since the clutch is intended for use in a fast motor vehicle such as a racing or sports car, the intermediate discs 6, 7 and 8 in this example contain carbon, as do the friction discs 9 and 10. The latter are coupled to the hub 11 through teeth 91 and 101 (see FIGS. 6 and 4), which engage in complementary axial grooves 117 formed in the hub 11.

The hub 11 has an integral central portion with a splined internal bore, for mounting it on the input shaft (not shown) of the gearbox of the vehicle, for rotation with the input shaft. This central portion carries a radial web 111, which itself carries a fork 112 having two branches spaced apart from each other and extending radially outwards. The branches of the fork 112 are separated by a groove or gap 118. The width of each branch of the fork is greater than the thickness of the thickened inner periphery of the friction disc 10 or 9 concerned. The branches of the fork 112 are provided with grooves 117, with which the teeth 91 and 101 of the friction discs 9 and 10 respectively are arranged to cooperate. In order to facilitate machining, the grooves 117 are aligned axially from one branch of the fork to the other. Machining is then carried out by axial traverse of the fork 112.

It will be noted that in this example, the teeth 91 and 101 are trapezoidal in shape, and that the grooves 117 are of the same shape. The grooves 117 are bounded by projections 116 (which are here radial), while the teeth 91 and 101 are bounded respectively by recesses 92 and 102.

Each of four of the projections 116 accommodates one of four rivets 114, for which purpose they have apertures through which the rivets 114 can pass. The head of each rivet 114 bears on the surface of the branch that faces towards the other branch of the fork. The rivet head thus lies in the groove 118. Besides accommodating the rivet heads, the groove 118 also enables the inertia of the hub 11 to be reduced. The rivets 114 are hollow, and extend through the corresponding branch of the fork 112. The other end of each rivet 114 is upset so as to retain a ring 113 in contact with the corresponding axial end face of the fork 112.

In this instance, each branch of the fork 112 is provided with two of the rings 113 and two rivets 114. The rings 113 define shoulders which are adapted to cooperate respectively with the disc 9 and the disc 10. In a modification, the rings 113 may be carried by bolts extending through the fork 112.

Due to the above arrangement, the hub 11 is located axially by the friction discs 9 and 10, so that during the assembly operation, while the input shaft of the gearbox is being inserted in the hub, there is no danger of the hub being ejected.

In addition, the rings 113 enable the movement of the friction discs 9 and 10 to be limited during a declutching operation. This enables the discs 9 and 10 to be displaced by a satisfactory amount. Furthermore, it also enables a sub-assembly, readily able to be handled and transported, to be built. This sub-assembly comprises the friction discs 9, 10 and the intermediate disc 7. All of this simplifies the clutch assembly operation.

The securing means 15 (FIGS. 3 and 4) mentioned earlier comprise axial securing means having a resilient gripping action, and are mounted between the pressure plate 5 and its associated intermediate disc 8. The axial securing means comprise at least one axial fastening device 15 inserted in a hood portion 28.

In this example, the intermediate disc 8 adjacent to the pressure plate 5 is joined to the latter through at least one of these fastening devices 15, the latter having the resilient gripping effect and being fitted in a tenon 81. One fastening device 15 is associated with each tenon 81 as, can be seen in FIG. 1. However, if required the number of the fastening devices 15 can of course be smaller than the number of tenons 81.

Figure 7:
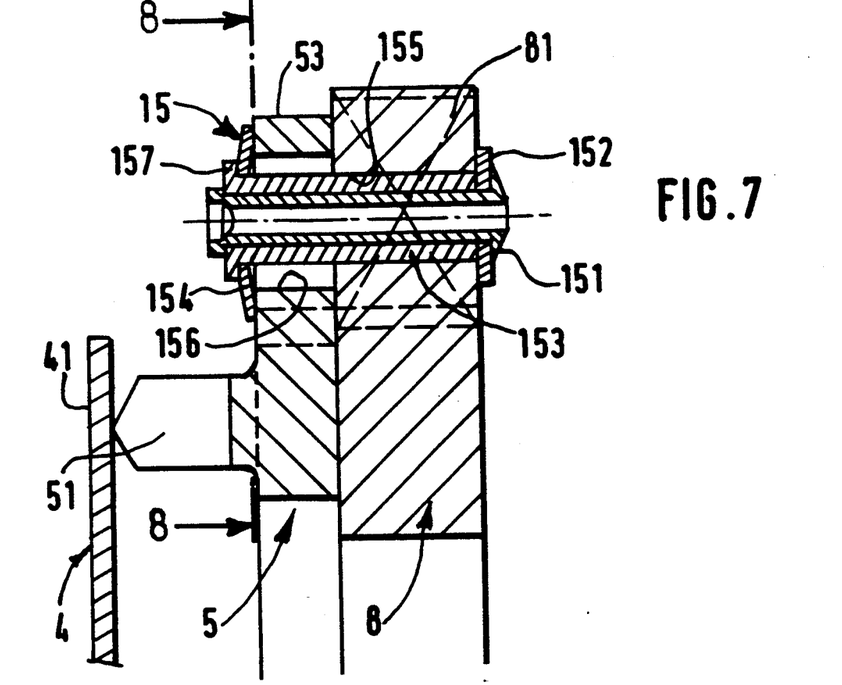
FIG. 7 is a view in cross section showing the securing means whereby the pressure plate is attached to its associated intermediate disc.
Figure 8:
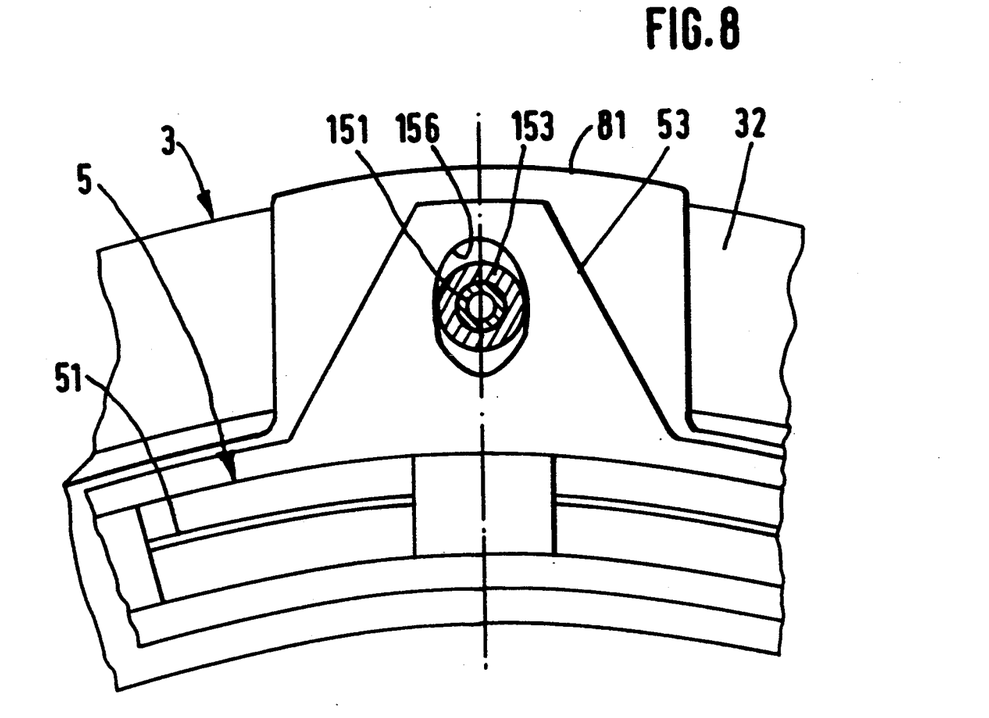
FIG. 8 is a partial view, seen in cross section on the line 8—8 in FIG. 7, with the intermediate crown included.
Figure 9:
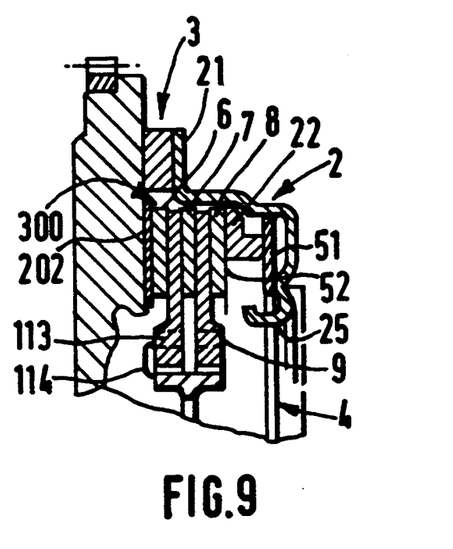
FIG. 9 is a partial view similar to FIG. 2, but showing a modification having resilient rings for exerting a progressive axial thrust.

Referring to FIGS. 7 and 8, the pressure plate 5 has three ears 53, trapezoidal in shape and projecting radially outwardly from the outer periphery of the pressure plate. These ears 53 lie in line with the corresponding tenons 81 of the intermediate disc 8, as can be seen best in FIG. 8.

Still referring to FIGS. 7 and 8, each of the three fastening devices 15 comprises a ring 152 and a tubular rivet 151, which passes through a centering and spacing tube 153 having a shoulder 157 at one of its ends. The tube 153 and the rivet 151 pass through an opening 155 which is formed in the tenon 81, and a hole 156 which is formed through the ear 53. The fastening device 15 also includes an axially acting resilient means 154, which in this example is a Belleville ring. The latter bears, firstly on the face of the ear 53 which is directed towards the diaphragm 4 (and therefore towards the base portion 23 of the cover plate 2), and secondly on the shoulder 157 of the tube 153.

Instead of the Belleville ring 154, this resilient means could instead consist of a coil spring or a corrugated ring, for example of figure-of-eight form.

The other end of the tube 153 is in contact with the ring 152, bearing against the face of the tenon 81 which is directed away from the ear 53, and therefore facing towards the reaction plate 1. In a modification, in place of the tube 153, a shouldered centering pin may be provided, this centering pin being adhesively secured to the tenon 81. In a further modification, a screw or bolt may be used, fixed to the tenon 81 and having a plain centering portion for cooperating with the hole 156.

The ring 152 is held in position by the upset end of the expandable rivet 151. The head of the latter is shouldered and is in contact with the shouldered end 157 of the tube 153, while the main portion or shank of the rivet 151 passes through the tube 153.

The hole 156 in the ear 53, which in this example is narrower in the circumeferential direction than the tenon 81, is oblong in shape, with parallel side edges extending radially and joined to each other through rounded base portions. The axis of symmetry of the hole 156 passes through the centre of rotation of the pressure plate 5, and the tube 153 is in point contact with the side edges of the holes 156. The pressure plate is thus centred with respect to the axis of the assembly, by virtue of the tube 153 cooperating with the contour of the hole 156, together with the tenon 81 which is centred by the axial lugs 32 (FIG. 3). The pressure plate 5 is butted against the intermediate disc 8, which enables the length of the lugs 32 to be reduced.

The tenons 81 are themselves in cooperation with the mortices 36 of the crown 3. Accordingly, the pressure plate 5 is movable axially with respect to the cover plate 2, while being coupled to the latter, for rotation with it, by means of the tenons 81 and tubes 153.

The intermediate disc 8 is made of a carbon based material, while the pressure plate 5 is for example made of aluminium. By virtue of the shouldered tube 153, the resilient means 154 and the hole 156, it becomes possible to absorb any differential thermal expansion or contraction that may arise due to differences in temperature between the intermediate disc 8 and the pressure plate 5.

The dimensions and stiffness of the resilient means 154 are selected with a view to retaining the pressure plate against the intermediate disc 8, without a clearance between them, when the clutch is operating, while still enabling the Belleville ring or other resilient means 154 to yield axially in order to accommodate thermal movement of the pressure plate 5. The length of the shouldered tube 153 is also selected accordingly, in such a way that in its compressed position, the resilient means 154 will exert a sufficiently large thrust to hold the pressure plate 5 and the intermediate disc 8 together without a clearance between them.

This arrangement is of particular advantage in a sports or racing car or other high speed motor vehicle, because the clutch is able to reach high temperatures without any risk of undue deterioration of the friction discs, while at the same time the inertia is low. By virtue of the arrangement described above, the pressure plate 5 is resiliently butted against the intermediate disc 8, without any clearance appearing between them during the retraction of the intermediate disc 8 in the declutching operation. The Belleville ring 154 causes the pressure plate 5 and intermediate disc 8 to be gripped together resiliently. As mentioned above, it is dimensioned accordingly.

It will be noted that the pressure plate 5 has radial channels 52, which are open axially at the level of the intermediate disc 8 and in line with holes 26 (FIG. 3) formed in the skirt portion 22 of the cover plate 2. This provides a ventilation facility for the pressure plate 5, which enables the temperature of the diaphragm 4 to be reduced, so avoiding any undue deterioration in the resilient characteristics of the diaphragm under the effect of heat in operation.

Figure 4:
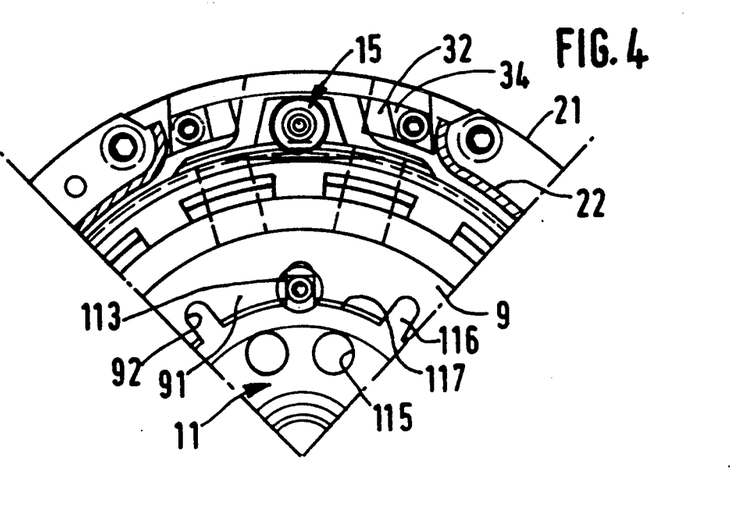
FIG. 4 is a view in cross section, showing part of the clutch, the cross section being taken on the line 4—4 in FIG. 2.

It will also be noted that the radial web 111 of the hub 11 is perforated at 115, FIG. 4, thus reducing the weight of the hub 11 and improving the ventilation of the latter.

As can be seen in FIG. 6, one of the sides, or lateral edges, 120 of the tenons 81, 71, 61 of the intermediate discs 8, 7, 6 respectively passes through the centre of rotation O of the intermediate disc concerned. In general terms, the axis of symmetry 121 of each tenon does not pass through the centre of rotation O of the corresponding intermediate disc. This is important because, in a clutch having two or more discs, their two sides 50 and 60 (see FIG. 6) will in certain cases not be interchangeable after the clutch has been refitted. The arrangement described and shown ensures that during refitting of the discs 6, 7 and 8, the latter cannot be refitted the wrong way round.

Figure 2:
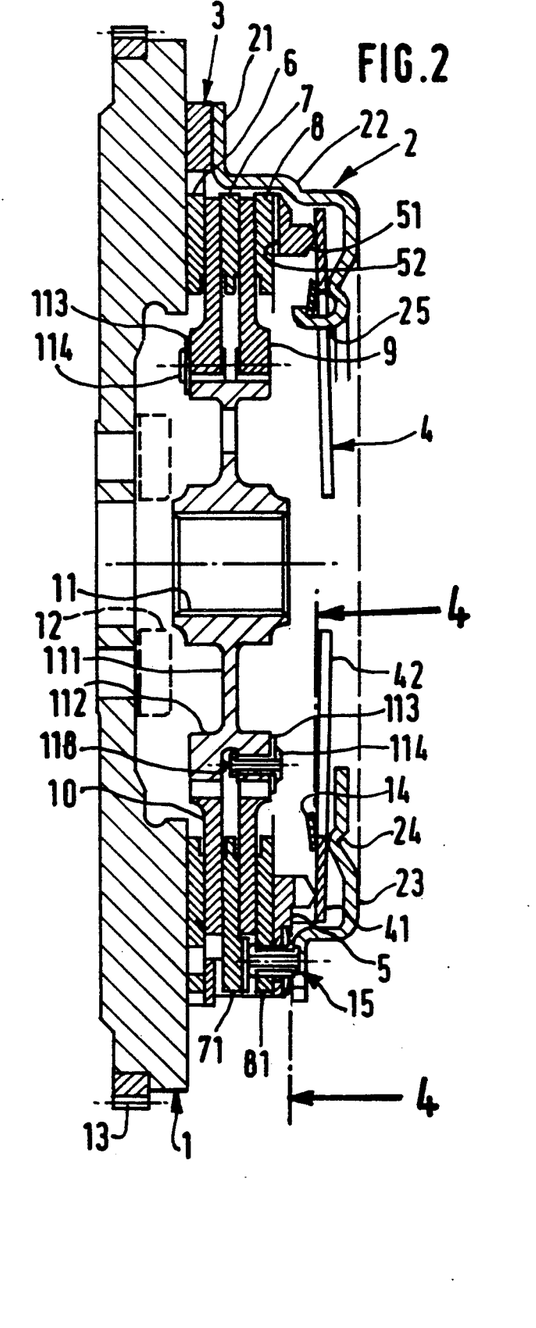
FIG. 2 is a view in cross section taken on the line 2—2 in FIG. 1.

It will be recalled that in the normal position with the clutch engaged, the diaphragm 4 bears against the bead 24 and on the lip 51 (FIG. 2), so that the pressure plate 5 is urged towards the reaction plate 1 so as to grip the intermediate discs 6, 7 and 8 and the friction discs 9 and 10 between the pressure and reaction plates. In order to disengage the clutch (i.e. to perform the declutching operation), it is merely necessary to apply a thrust by means of a clutch release bearing (not shown) on to the inner end of the fingers 42 of the diaphragm 4, so as to cause the diaphragm to tilt and overcome the axial thrust which the diaphragm exerts on the pressure plate 5.

It will be noted that during declutching, the friction discs 9 and 10 have a sufficient degree of movement, that is to say a gap exists between the discs 6, 7 and 8 and the friction discs 9 and 10. This is due mainly to the retention of the disc 6 in the axial direction (as already described), together with the engagement of the intermediate disc 8 with the pressure plate 5 which is obtained by means of the fastening devices 15. The friction discs 9 and 10 are also able to slide freely due to their mounting on the hub 11, which is achieved with only simple machining.

It will be appreciated that the fitting of the clutch makes use of sub-assemblies. These are: the sub-assembly consisting of the reaction plate 1, intermediate disc 6 and intermediate crown 3; the sub-assembly consisting of the hub 11, the friction discs 9 and 10 and the intermediate disc 7; the sub-assembly consisting of the pressure plate 5 and intermediate disc 8; and finally a sub-assembly consisting of the cover plate 2 and diaphragm 4. After the crown 3 and intermediate disc 6 have been fitted, it is then only necessary to fit into the mortices 36 the sub-assembly that includes the hub 11, then to fit the pressure plate 5 with its intermediate disc 8, and finally to fit the cover plate 2 with its diaphragm 4.

As will be clear from the foregoing description and from the drawings, the thickness of the closure ring 31 and the distance between the notches 33 and the base of the mortices 36 will be determined according to the application to which the clutch is to be put. In particular, it depends on the thickness of the friction disc 10, which (like the other friction disc 9) is thickened at its base to permit its sliding movement on the hub 11.

Similarly, it will be understood that the arrangements described above enable resilient means to be easily fitted, with these resilient means exerting a progressively increasing axial thrust so as to improve the comfort of the driver and to give good contact between the discs 6 to 10 and good ventilation of the pressure and reaction plates. Such resilient means may be associated with both the pressure plate 5 and with the reaction plate 1, and may be identical in shape. For example, and referring to FIGS. 9 to 13, they may each consist of a corrugated, resilient metallic ring 200, 300, having three radial lugs 201 on its outer periphery.

The body of the ring 200, 300 consists of circumferentially alternating radial portions 202, 203, joined together through oblique folds 205. In order to achieve standardisation of the rings 200, 300, each lug 201 has an oblong hole 204. Each hole 204 has two radial side edges which are joined together through rounded corners. These holes 204 are identical, in this example, to the holes 156 in the pressure plate 5.

Figures 10, 13:
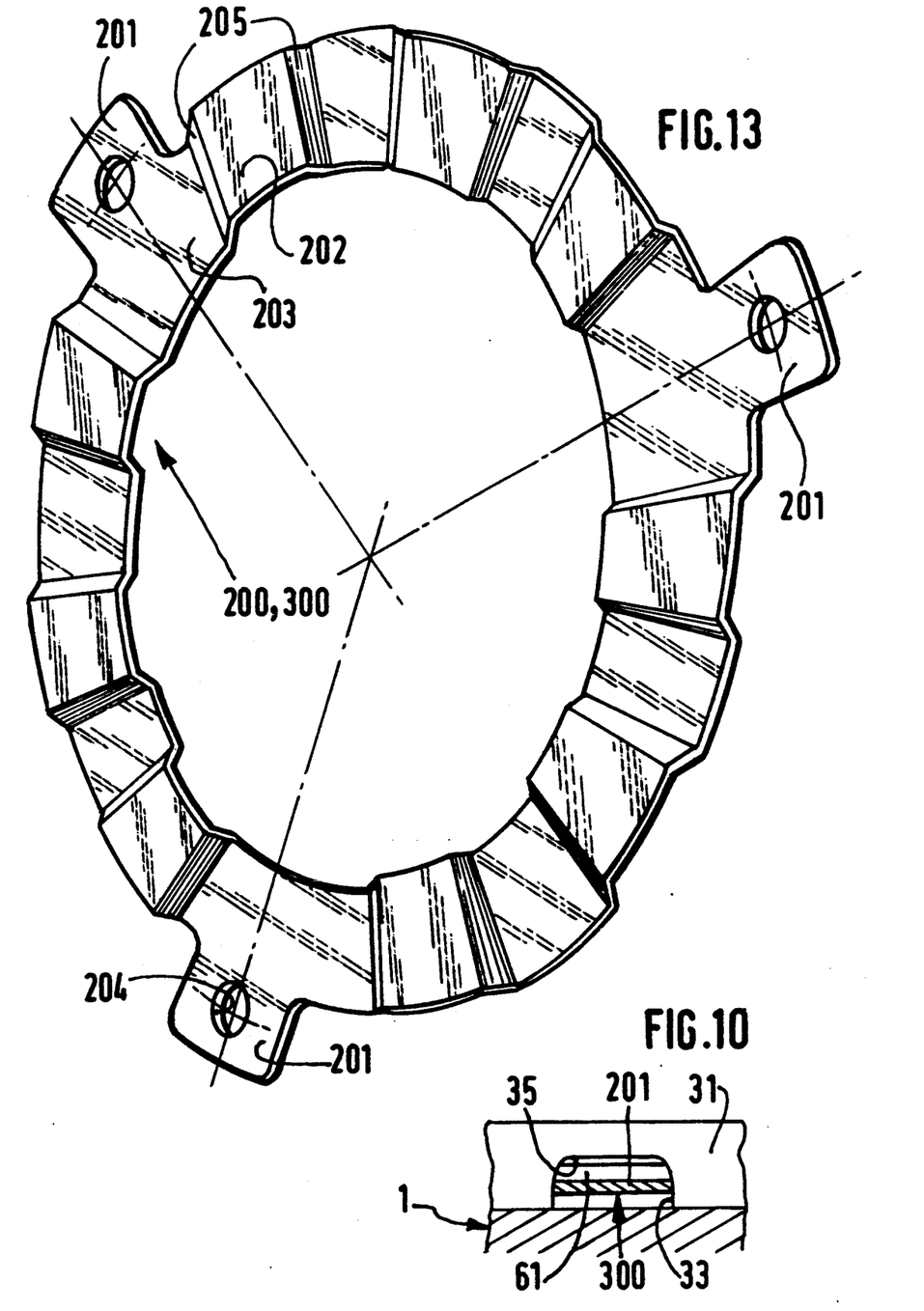
FIGS. 10 to 12 are views similar to FIGS. 5 to 8 respectively, but showing the modified embodiment seen in FIG. 9.
FIG. 13 is a perspective view of the progressive thrust ring itself.
Figure 11:
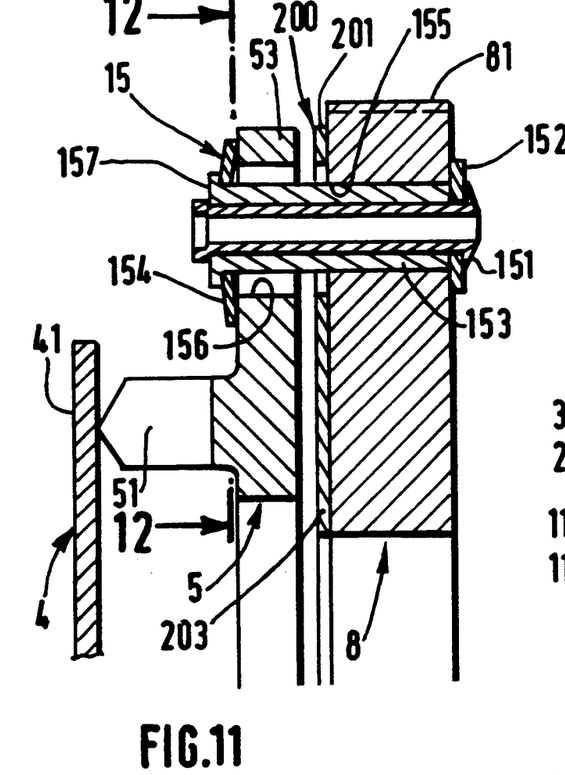

The ring 200, 300 is both light in weight and thin. In this example there are three of the lugs 201 to each ring, with each lug 201 projecting from one of the radial portions 202, 203 of the ring. As shown in FIG. 13, the lugs 201 project from radial portions 203.

Thus the resilient ring 300 associated with the reaction plate 1 comprises lugs 201 which are arranged to cooperate in a mating manner with the notches 33 of the closure ring 31, so as to provide a coupling of the tenon and mortice type. In this case, the rounded stop surface 35 (FIG. 5) is not mandatory.

The lugs 201 are in contact with the tenons 61, and have a circumferential width substantially equal to the circumferential width separating the lateral flanks of the notches 33, with the depth of the latter depending on the thickness of the ring 300. The ring 300 is centred by means of the radial notches 33, by virtue of the lateral contact of the lugs 201 with the notches 33 and the fact that there are three of the latter. This ring 300 is interposed axially between the reaction plate 1 and its adjacent intermediate disc 6, with the radial portions 202 of the ring being in contact with the reaction plate 1, and its other radial portions 203 (some of which are extended by the lugs 201) in contact with the intermediate disc 6.

Figure 12:
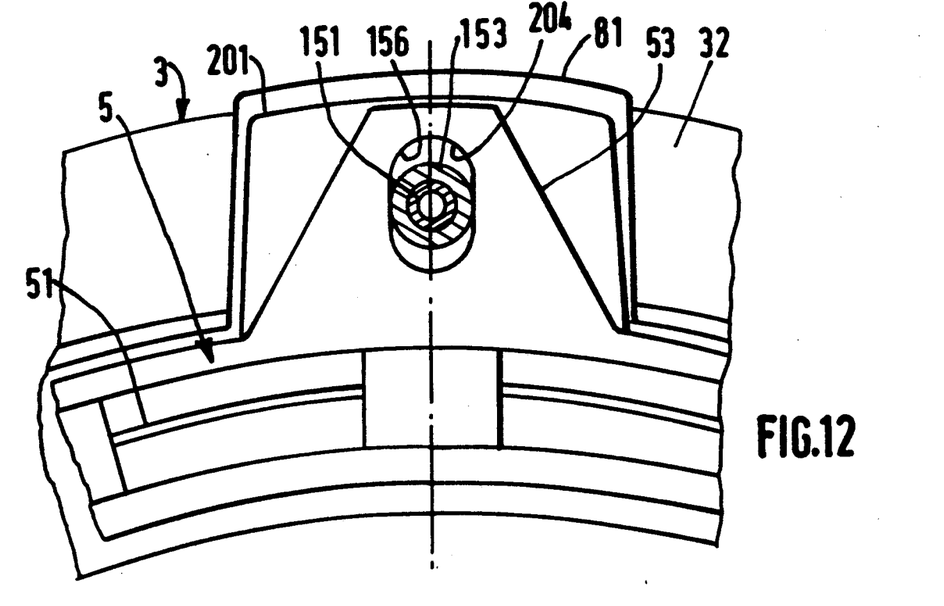

The other corrugated resilient metal ring 200 is associated with the pressure plate 5 and with its adjacent intermediate disc 8. The ring 200 is interposed axially between the plate 5 and disc 8, and is in contact with the latter through its radial portions 203 and lugs 201. The ring 200 is in contact with the pressure plate 5 through its radial portions 202. The lugs 201 are in contact with the tenons 81, and are traversed by the tubes 153, as can clearly be seen in FIG. 11. As shown in FIG. 12, the tubes 153 come into side contact with the holes 204, enabling thermal expansion and contraction to be accommodated.

The dimensions and stiffness of the resilient ring 154, which may for example be in the form of a Belleville ring, are of course preferably chosen so as not to compress the ring 200 fully in the declutched state and during declutching, while still enabling the ring 154 to yield axially in order to accommodate thermal movement of the pressure plate 5. Similarly, the ring 300, which is arranged to exert the same thrust, does not become fully compressed in the engaged position of the clutch.

During operation of the clutch, in order to obtain a progressive clutch engaging action, the rings 200 and 300 are thus compressed resiliently. The intermediate disc 6 becomes axially displaced, while remaining in contact with the notches 33.

The resilient rings 200 and 300 may of course be made of different stiffnesses, so as to exert different thrusts. In this way it is possible to arrange for the ring 300 associated with the reaction plate to become compressed first, or vice versa. Preferably, the rings 200 and 300 are not fully compressed: this enables good ventilation of the discs and of the pressure and reaction plates to be obtained, as well as good cooperation of the various surfaces involved.

The rings 200 and 300 may also be different as to the shapes of their lugs 201. The rings may also be flanged. Thus, the radial portions 203 and the lugs 201 may be in contact with either the reaction plate 1 or the pressure plate 5, and the radial portions 202 may be in contact with either one of the intermediate discs 6 and 8.

In a modification, only the reaction plate 1 has a resilient ring 200 or 300 associated with it, the pressure plate 5 not having a resilient ring associated with it; or vice versa. The profile of the ring 200 or 300 may be sinusoidal. The tenons 61 may be provided with dowels or bolts for centring the resilient ring 300. In that case, suitable apertures must be provided in the reaction plate.

The present invention is of course not limited to the embodiments described. Thus, for example, instead of the member 3, a plurality of spacing blocks may be used.

These spacing blocks are then fixed to the cover plate 2 and to the reaction plate 1 in the manner described in the specification of French published patent application No. FR 2 623 862A. Between the intermediate discs that are closest to the reaction plate, these spacing blocks have circumferential extensions for cooperating with the appropriate intermediate disc in order to locate the latter axially. In that case, the thrust surface (e.g. the surface 35) is offset circumferentially with respect to the rotational driving means itself. Each circumferential extension or extensions mentioned above, associated with a respective one of the spacing blocks, may be provided with a notch similar to the notch 33 seen in FIG. 5. Similarly, the base of the notch 33 may constitute the thrust surface in accordance with the invention, with the relevant face of the tenon constituting the cooperating reaction surface.

The axial lugs 32 may comprise projections for cooperating with mortices formed in the discs 7 and 8. In a modification, the crown 3 comprises the closure ring 31 with dowels or pins, carried by the closure ring 31 and extending axially towards the base portion 23 of the cover plate 2. Each dowel engages in holes formed in radial lugs formed respectively in the disc 7 and the disc 8.

The clutch may include more than two friction discs, and thus more than three intermediate discs. The pressure plate 5 may cooperate directly with one of the friction discs; in that case the clutch of FIG. 1 will have only two intermediate discs. The clutch may be of the "pull" type.

Finally, the pressure plate may be subjected to the action of engagement means that comprise a component other than a diaphragm. This may for example consist of a hydraulic actuator device of the piston and cylinder type. Alternatively, it may consist of a plurality of coil springs with declutching levers.

What is claimed is:

1. A clutch comprising:
   a reaction plate;
   a cover plate secured to said reaction plate;
   a pressure plate;
   means mounting the pressure plate to the cover plate for rotation with the cover plate and for axial movement with respect to the cover plate;
   a hub mounted coaxially with the pressure plate and reaction plate;
   at least two friction discs secured to the hub for rotation therewith and disposed between said pressure plate and reaction plate;
   at least two intermediate discs, said intermediate discs arranged alternately with said friction discs;
   at least one intermediate driving member coupling the intermediate discs to the reaction plate for rotation therewith, said intermediate driving member is an intermediate crown which comprises a closure ring and a plurality of axial lugs carried by said closure ring for driving in rotation a first one of said intermediate discs arranged between two of said friction discs, the clutch further including at least one tenon carried by a second one of said intermediate discs that is adjacent the reaction plate, the closure ring being formed with at least one notch on that face thereof that faces towards the reaction plate, each said at least one tenon being associated with one of said notches for axially locating said second intermediate disc adjacent to the reaction plate.

2. A clutch according to claim 1, wherein said tenon has inclined edges, with each said at least one notch of the intermediate drive member having a base portion, lateral flanks, and rounded portions joining the base portion of the notch to its lateral flanks, whereby the inclined edges of the tenon are able to nest in the rounded portions.

3. A clutch according to claim 2, wherein the thickness of the tenon is less than the depth of the notch.

4. A clutch according to claim 1, wherein the intermediate crown has a plurality of said axial lugs defining mortices, with a third one of said intermediate discs that is, adjacent to the pressure plate, having tenons for cooperation with said mortices, the clutch further comprising at least one fastening means holding said pressure plate against said third intermediate disc by resilient gripping action.

5. A clutch according to claim 4, wherein the pressure plate has at least one ear having an opening formed through it, the tenons on said third intermediate disc that is adjacent to the pressure plate having a further opening formed therethrough, and said fastening means including a tube passing through the further opening and the opening in the ear.

6. A clutch according to claim 5, wherein the opening in the ear is an oblong hole.

7. A clutch according to claim 4, wherein the axial lugs of the intermediate crown define mortices and have lateral shoulders for securing to the reaction plate, said notches being formed in line with said mortices.

8. A clutch according to claim 1, further comprising axially and progressively acting resilient means interposed axially between the reaction plate and said second intermediate disc arranged adjacent the reaction plate, with said resilient means engaging in said notches of the intermediate drive member, whereby to obtain a progressive engagement of the clutch.

9. A clutch according to claim 8, wherein said axially acting resilient means comprise a corrugated resilient ring, having radial lugs at its outer periphery for mating cooperation with said notches of the intermediate drive member.

10. A clutch according to claim 9, wherein the corrugated ring has first radial portions for contact with the reaction plate and second radial portions, arranged alternately with the first radial portions, for contact with the adjacent intermediate disc, said radial lugs being joined together through oblique folds formed in the ring.

* * * * *